US008654781B2

(12) United States Patent
Liang et al.

(10) Patent No.: US 8,654,781 B2
(45) Date of Patent: Feb. 18, 2014

(54) METHOD AND DEVICE FOR DOWNLINK COOPERATION RETRANSMISSION IN A RELAY STATION

(75) Inventors: Feng Liang, Guangdong Province (CN); Feng Bi, Guangdong Province (CN); Ming Yuan, Guangdong Province (CN); Jin Yang, Guangdong Province (CN); Shuanshuan Wu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 335 days.

(21) Appl. No.: 13/257,626

(22) PCT Filed: Mar. 23, 2010

(86) PCT No.: PCT/CN2010/071194
§ 371 (c)(1),
(2), (4) Date: Nov. 2, 2011

(87) PCT Pub. No.: WO2010/127573
PCT Pub. Date: Nov. 11, 2010

(65) Prior Publication Data
US 2012/0120865 A1    May 17, 2012

(30) Foreign Application Priority Data
May 4, 2009    (CN) .......................... 2009 1 0139348

(51) Int. Cl.
*H04J 3/16* (2006.01)
(52) U.S. Cl.
USPC ......................................... 370/437
(58) Field of Classification Search
None
See application file for complete search history.

(56) References Cited

U.S. PATENT DOCUMENTS

| 2008/0273616 | A1  | 11/2008 | Papasakellariou |
|---|---|---|---|
| 2010/0265874 | A1* | 10/2010 | Palanki et al. ................ 370/315 |
| 2011/0176477 | A1* | 7/2011 | Lee et al. ...................... 370/315 |

(Continued)

FOREIGN PATENT DOCUMENTS

| CN | 101383685 A | 3/2009 |
|---|---|---|
| EP | 2015504 A2  | 1/2009 |
| JP | 2009005227 A | 1/2009 |

OTHER PUBLICATIONS

International Search Report for PCT/CN2010/071194 dated Jun. 9, 2010.

*Primary Examiner* — Chirag Shah
*Assistant Examiner* — Amar Persaud
(74) *Attorney, Agent, or Firm* — Ling Wu; Stephen Yang; Ling and Yang Intellectual Property

(57) ABSTRACT

The invention discloses a method and apparatus for relay station downlink cooperative retransmission, wherein said method comprises: a relay station carrying out physical layer processing in advance on data which requires retransmitting according to different scenarios associated with different possible number of available wireless resources for retransmitting data in a retransmission subframe, generating corresponding OFDM signals, and monitoring the PCFICH of the retransmission subframe, and according to the monitoring result, selecting an OFDM signal which is corresponding to the determined number of available wireless resources from said OFDM signals to carry out retransmission transmitting. The present invention can efficiently solve the problem that the number of wireless resources varies during downlink retransmitting data and the relay station cooperative communication is unable to be carried out normally, without introducing any extra overhead and time delay, and without the control signaling, thus reducing the system complexity.

19 Claims, 6 Drawing Sheets

(56) References Cited

U.S. PATENT DOCUMENTS

| | | | |
|---|---|---|---|
| 2012/0106433 A1* | 5/2012 | Seo et al. | 370/315 |
| 2012/0113884 A1* | 5/2012 | Park et al. | 370/312 |
| 2012/0127910 A1* | 5/2012 | Li | 370/312 |
| 2012/0213148 A1* | 8/2012 | Saito et al. | 370/315 |
| 2013/0230013 A1* | 9/2013 | Seo et al. | 370/329 |

* cited by examiner (a) The available wireless resources number becomes more (b) The available wireless resources number becomes less

METHOD AND DEVICE FOR DOWNLINK COOPERATION RETRANSMISSION IN A RELAY STATION

TECHNICAL FIELD

The present invention relates to the mobile communication field, based on the mobile communication network into which the relay stations is introduced, and particularly, to a method and apparatus for relay station downlink cooperative retransmission.

BACKGROUND OF THE RELATED ART

The relay technique acts as an emerging technique, which attracts more extensive attention, and is considered as a key technique of the B3G/4G. Since wireless communication or cellular system in the future is required to increase the coverage range, and to support higher speed transmission, which puts forward a new challenge to the wireless communication technique. At the same time, the cost problem of constructing and maintaining the system becomes more outstanding. With the transmission speed and communication distance increasing, the energy consumption problem of the battery also becomes outstanding, and wireless communication in the future will use the higher frequency, which cause more serious path loss attenuation. By the relay technique, the traditional single-hop link is divided into a plurality of multi-hop links, and since the distance is decreased, the path loss is reduced greatly, which contributes to improving the transmission quality and extending the communication range, and thereby providing faster and better services for users.

In the relay network, a link between a user that the relay station participates in serving and the relay station is called an Access Link, a link between a relay station and a base station is called a Backhaul Link, and a user that the base station participates in serving and the base station is called a Direct Link, as shown in FIG. 1.

When a user locates in the joint coverage range of the base station and the relay station, a cooperative communication method can be used to make the base station and the relay station serve the user together, and thus improving the system capacity and the resources utilization efficiency, as shown in FIG. 2.

Relay station downlink cooperative retransmission is a relay network cooperative communication mode, and when this mode is used, and when the relay station has a receiving error only in the downlink transmission of the first transmission subframe in the Direct Link and the transmitter is required to carry out the retransmission, the corresponding downlink retransmission transmitting is carried out in the retransmission subframe in the Access Link to improve the transmission success rate of the downlink retransmission. Relay station downlink cooperative retransmission is a cooperative mode of small overhead, good compatibility and nearly no modification being necessary to the existing system, as shown in FIG. 3.

However, when the relay station carries out the cooperative retransmission on the downlink data in the Direct Link, such a case may be encountered: in the retransmission subframe, since the number of wireless resources occupied by the Physical Downlink Control Channel (PDCCH) varies compared with the first transmission subframe, which causes that the number of available wireless resources during retransmitting data is different from that during the first transmission, and that means the retransmission transmitter is required to carry out corresponding adjustment in the physical layer processing to match the available wireless resources in the current retransmission subframe. However, the relay station does not know what kind of variance occurs on the number of available wireless resources during the retransmission of data, and is unable to carry out the corresponding physical layer processing normally during the retransmission transmitting, which may cause the interference among the retransmission signals or a waste of the wireless resources, and even the retransmission failure, and the system performance is reduced, as shown in FIG. 4.

A method currently put forward to solve the above problem is that the base station notifies the relay station how to carry out the retransmission transmitting by the control signaling in a certain control subframe in advance, or notifies the available wireless resources status in the retransmission subframe to the relay station, and then the relay station carries out the corresponding physical layer processing on the Transport Block (TB) which requires retransmitting according to the control signaling received from the base station, and carries out the cooperative retransmission transmitting in the retransmission subframe, as shown in FIG. 5.

The drawback in the above method is that the base station is required to send the control signaling to the relay station before the cooperative retransmission transmitting, which introduces extra overhead; and the relay station is required to receive this control signaling in a certain control subframe, and since the self interference should be avoided, this control subframe is unable to be configured as other user's cooperative retransmission subframe, which severely affects the flexibility of the subframe configuration; besides, the base station is required to start to generate the control signaling and carry out the transmitting after determining the available wireless resources status in the retransmission subframe, and the relay station is also required to carry out the corresponding physical layer processing process after receiving and correctly analyzing the control signaling from the base station and finally carry out the retransmission transmitting, which will bring a lot of time delay, and severely reduce the service quality and resources utilization efficiency.

SUMMARY OF THE INVENTION

The technical problem to be solved in the present invention is to put forward a method and apparatus for relay station downlink cooperative retransmission, which solves the problem that the wireless resources number varies during downlink retransmitting data and the relay station cooperative communication is unable to be carried out normally, without introducing any extra overhead and time delay.

In order to solve the above technical problem, the present invention provides a method for relay station downlink cooperative retransmission, comprising:

a relay station carrying out physical layer processing in advance on data that requires retransmitting according to different scenarios associated with different possible number of available wireless resources for retransmitting data in a retransmission subframe, and generating corresponding Orthogonal Frequency Division Multiplexing (OFDM) signals, and said relay station monitoring the Physical Control Format Indicator Channel (PCFICH) of the retransmission subframe to obtain the determined number of occupied symbols of the Physical Downlink Control Channel (PDCCH) in the retransmission subframe; and according to the determined number of occupied symbols of the PDCCH in the retransmission subframe obtained from the monitoring result, said relay station selecting one OFDM signal which is corresponding to the determined number of available wireless resources for retransmitting the TB in the retransmission subframe from the OFDM signals generated from the Transport Block (TB) that requires retransmitting obtained by the physical layer processing step, and retransmitting the selected OFDM signal in the retransmission subframe.

In the method of the present invention, the step of carrying out physical layer processing and generating OFDM signals comprises:

when the relay station is required to carry out the downlink cooperative retransmission, carrying out physical layer processing on a Transport Block (TB) that requires retransmitting, and before carrying out rate matching on the TB which requires retransmitting or a Code Block (CB) obtained by sectioning this TB, obtaining the number of available bits to be determined for retransmitting this TB; and the relay station taking said number of available bits to be determined for retransmitting this TB as the number of available bits for retransmitting this TB, carrying out the rate matching on this TB or the CB obtained by sectioning this TB, and continuing to carry out physical layer processing on the TB or CB for which the rate matching has been completed, and generating OFDM signals;

wherein in the step of monitoring the PCFICH of the retransmission subframe, the relay station monitors the PCFICH of the retransmission subframe to obtain a determined number of occupied symbol of a Physical Downlink Control Channel (PDCCH) in the retransmission subframe;

in the step of selecting the OFDM signal to carry out retransmission transmitting, regarding the TB which requires retransmitting, according to the obtained determined number of occupied symbols of the PDCCH in the retransmission subframe, the relay station selects one OFDM signal which is corresponding to the determined number of available wireless resources for retransmitting TB in the retransmission subframe from the obtained OFDM signals generated by the TB which requires retransmitting, and retransmits the selected OFDM signal in the retransmission subframe.

The above method has following characteristics:

in the step of obtaining the number of available bits to be determined for retransmitting this TB, according to the number of occupied symbols to be determined of the PDCCH in the retransmission subframe, a total number of available symbols in the retransmission subframe, the number of sub-carriers and the number of modulation orders allocated to the TB which requires retransmitting, and a total number of Resource Element (RE) occupied by a pilot, a synchronization signal and a system broadcast message, the relay station obtains the number of available bits to be determined of one or more cases of retransmitting this TB.

The above method has following characteristics:

in the step of obtaining the number of available bits to be determined for retransmitting this TB, when the number of occupied symbols to be determined of the PDCCH in the retransmission subframe has N cases, in the kth case, the number of symbols occupied by the PDCCH in the retransmission subframe is $N_{S\_PDCCH}^{(k)}$, wherein $1 \leq k \leq N$, and N is a positive integer; and the total number of available symbols in the retransmission subframe is $N_{S\_All}$, and the available number of symbols to be determined $N_{S\_U}^{(k)}$ for retransmission in the retransmission subframe is obtained in a following way:

$$N_{S\_U}^{(k)} = N_{S\_All} N_{S\_PDCCH}^{(k)};$$

at this time, the number of sub-carriers and the number of modulation orders allocated to the TB which requires retransmitting are respectively $N_{C\_U}$ and $Q_m$, the total number of REs occupied by the pilot, the synchronization signal and the system broadcast message is $N_{RE}'$, and then the number of available bits to be determined $N_{B\_U}^{(k)}$ in the N cases of retransmitting this TB is obtained in a following way:

$$N_{B\_U}^{(k)} = (N_{S\_U}^{(k)} \times N_{C\_U} - N_{RE}') \times Q_m.$$

The above method has following characteristics:

in the step of carrying out the rate matching, said relay station respectively takes the number of available bits to be determined in each case as a total number of available bits for retransmitting this TB to carry out the rate matching respectively, and correspondingly outputs one or more TBs or CBs for which the rate matching has been completed, and continues to carry out physical layer processing until generating one or more OFDM signals correspondingly.

The above method has following characteristics:

in the step of selecting the OFDM signal to carry out retransmission transmitting, according to the determined number of occupied symbols of the PDCCH in the retransmission subframe, the relay station further obtains the determined number of available symbols for retransmitting this TB in the retransmission subframe, and according to said determined number of available symbols for retransmitting this TB in the retransmission subframe, selects one OFDM signal which is corresponding to the determined number of available wireless resources for retransmitting TB in the retransmission subframe to carry out retransmission transmitting;

said determined number of available symbols $N_{S\_U}'$ of retransmitting this TB in the retransmission subframe is obtained in a following way:

$$N_{S\_U}' = N_{S\_All} N_{S\_PDCCH}',$$

wherein $N_{S\_All}$ is the total number of available symbols in the retransmission subframe, and $N_{S\_PDCCH}'$ is the determined number of occupied symbols of the PDCCH in the retransmission subframe.

The above method has following characteristics:

in the step of selecting the OFDM signal to carry out retransmission transmitting, according to the determined number of occupied symbols of the PDCCH in the retransmission subframe, the relay station further obtains the determined number of available symbols for retransmitting this TB in the retransmission subframe, and further obtains the determined number of available bits for retransmitting this TB, and according to said determined number of available bits for retransmitting this TB, selects one OFDM signal which is corresponding to the determined number of available wireless resources for retransmitting TB in the retransmission subframe to carry out retransmission transmitting;

said determined number of available bits $N_{B\_U}'$ for retransmitting this TB is obtained in a following way:

$$N_{B\_U}' = (N_{S\_U}' \times N_{C\_U} - N_{RE}') \times Q_m,$$

wherein is $N_{S\_U}'$ is the determined number of available symbols for retransmitting this TB in the retransmission subframe, $N_{C\_U}$ is the number of sub-carriers allocated to the TB which requires retransmitting, $Q_m$ is the number of modulation orders allocated to the TB which requires retransmitting, and $N_{RE}'$ is the total number of RE occupied by a pilot, a synchronization signal and a system broadcast message.

The above method has following characteristics:

after monitoring the PCFICH and before the retransmission transmitting, the relay station reserves a period as a guard interval, and the relay station does not carry out downlink receiving and downlink transmitting in the guard interval.

The above method has following characteristics:

in the step of retransmission transmitting, a base station and the relay station retransmits said OFDM signal which is corresponding to the determined number of available wireless resources at the same time, or only the relay station retransmits the OFDM signal which is corresponding to the determined number of available wireless resources.

In order to solve the above technical problem, the present invention provides an apparatus for downlink cooperative retransmission, comprising:

a physical layer processing module configured to carry out physical layer processing in advance on data that requires retransmitting according to different scenarios associated with different possible number of available wireless resources for retransmitting data in a retransmission subframe, and generate corresponding Orthogonal Frequency Division Multiplexing (OFDM) signals;

a monitoring module configured to monitor the Physical Control Format Indicator Channel (PCFICH) of the retransmission subframe to obtain the determined number of occupied symbols of a Physical Downlink Control Channel (PDCCH) in the retransmission subframe;

a selecting and transmitting module connected with said physical layer processing module and the monitoring module respectively, and said selecting and transmitting module configured to regarding the TB that requires retransmitting, according to the determined number of occupied symbols of the PDCCH in the retransmission subframe obtained by the monitoring module, select one OFDM signal which is corresponding to the determined number of available wireless resources for retransmitting the TB in the retransmission subframe from the OFDM signals generated from the Transport Block (TB) that requires retransmitting obtained by the physical layer processing module, and retransmits the selected OFDM signal in the retransmission subframe.

The above apparatus has following characteristics:

said physical layer processing module comprises a first physical layer processing sub-module, a rate matching sub-module, and a second physical layer processing sub-module connected in sequence, and an obtaining sub-module connected with the rate matching sub-module;

said first physical layer processing sub-module is configured to carry out all or parts of steps of adding a Cyclic Redundancy Check (CRC) to a Transport Block (TB), Code Block (CB) sectioning and adding a CRC to the CB, and channel coding;

said obtaining sub-module is configured to obtain the number of available bits to be determined for retransmitting this TB;

said rate matching sub-module is configured to take said number of available bits to be determined for retransmitting this TB as the number of available bits for retransmitting this TB, carrying out the rate matching on this TB or the CB obtained by sectioning this TB which have been processed by the first physical layer processing sub-module;

said second physical layer processing sub-module is configured to carry out all or parts of steps of CBs concatenating, scrambling, modulating, layer mapping, pre-coding, and wireless resources mapping for TB or CB after the rate matching sub-module implements rate matching, and generate the OFDM signals.

The above apparatus has following characteristics:

said obtaining sub-module is configured to according to the number of occupied symbols to be determined of the PDCCH in the retransmission subframe, the total number of available symbols in the retransmission subframe, the number of sub-carriers and the number of modulation orders allocated to the TB which requires retransmitting, and the total number of REs occupied by a pilot, a synchronization signal and a system broadcast message, obtain the number of available bits to be determined in one or more cases of retransmitting this TB;

wherein when the number of occupied symbols to be determined of the PDCCH in the retransmission subframe has N cases, in the kth case, the number of occupied symbols to be determined of the PDCCH in the retransmission subframe is $N_{S\_PDCCH}^{(k)}$, wherein $1 \leq k \leq N$, and N is a positive integer; and the total number of available symbols in the retransmission subframe is $N_{S\_All}$, and the number of available symbols to be determined $N_{S\_U}^{(k)}$ for retransmission in the retransmission subframe is obtained by the obtaining sub-module in a following way:

$$N_{S\_U}^{(k)} = N_{S\_All} N_{S\_PDCCH}^{(k)};$$

at this time, the number of sub-carriers and the number of modulation orders allocated to the TB which requires retransmitting are respectively $N_{C\_U}$ and $Q_m$, the total number of REs occupied by the pilot, the synchronization signal and the system broadcast message is $N_{RE}'$, and then the number of available bits to be determined $N_{B\_U}^{(k)}$ ($1 \leq k \leq N$) in the N cases of retransmitting this TB is obtained by the obtaining sub-module in a following way:

$$N_{B\_U}^{(k)} = (N_{S\_U}^{(k)} \times N_{C\_U} - N_{RE}') \times Q_m,$$

The above apparatus has following characteristics:

said selecting and transmitting module is also configured to according to the determined number of occupied symbols of the PDCCH in the retransmission subframe, further obtain a determined number of available symbols of retransmitting this TB in the retransmission subframe, and according to said determined number of available symbols of retransmitting this TB in the retransmission subframe, select one OFDM signal which is corresponding to the determined number of available wireless resources for retransmitting this TB in the retransmission subframe to carry out retransmission transmitting; or according to the determined number of occupied symbols of the PDCCH in the retransmission subframe, further obtain a determined number of available symbols for retransmitting this TB in the retransmission subframe, and further obtain a determined number of available bits for retransmitting this TB, and according to said determined number of available bits for retransmitting this TB, select one OFDM signal which is corresponding to the determined number of available wireless resources for retransmitting this TB in the retransmission subframe to carry out retransmission transmitting.

In order to solve the above technical problem, the present invention provides a relay station, and said relay station comprises the above apparatus for downlink cooperative retransmission.

The present invention efficiently solves the problem that the wireless resources number varies during downlink retransmitting data and the relay station cooperative communication is unable to be carried out normally, without introducing any extra overhead and time delay, and without the control signaling, thus reducing the system complexity, saving the wireless resources, ensuring the flexibility of the subframe configuration, and improving the service quality and the resources utilization efficiency.

PREFERRED EMBODIMENTS OF THE PRESENT INVENTION

In the present invention, according to various existing cases that there are different possible number of available wireless resources for retransmitting data in the retransmission subframe, the relay station carries out the physical layer processing in advance on the data which requires retransmitting until generating the corresponding Orthogonal Frequency Division Multiplexing (OFDM) signals, and monitors the Physical Control Format Indicator Channel (PCFICH) in the retransmission subframe, and selects one suitable OFDM signal from the pre-generated corresponding OFDM signals to carry out the retransmission transmitting according to the monitoring result.

It will describe the present invention in detail with reference to figures and examples below.

Figure 1:
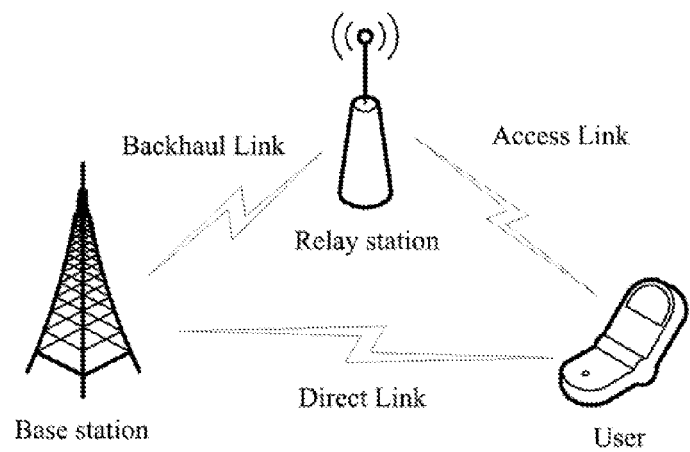
FIG. 1 is a structure schematic diagram of the communication network with the relay station (a relay network)
Figure 2:
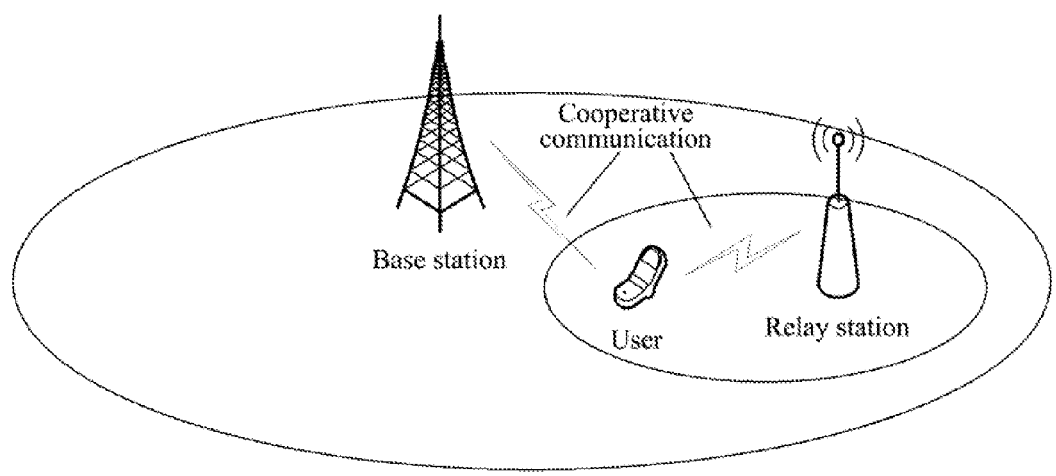
FIG. 2 is a schematic diagram of the relay network cooperative communication.
Figure 3:
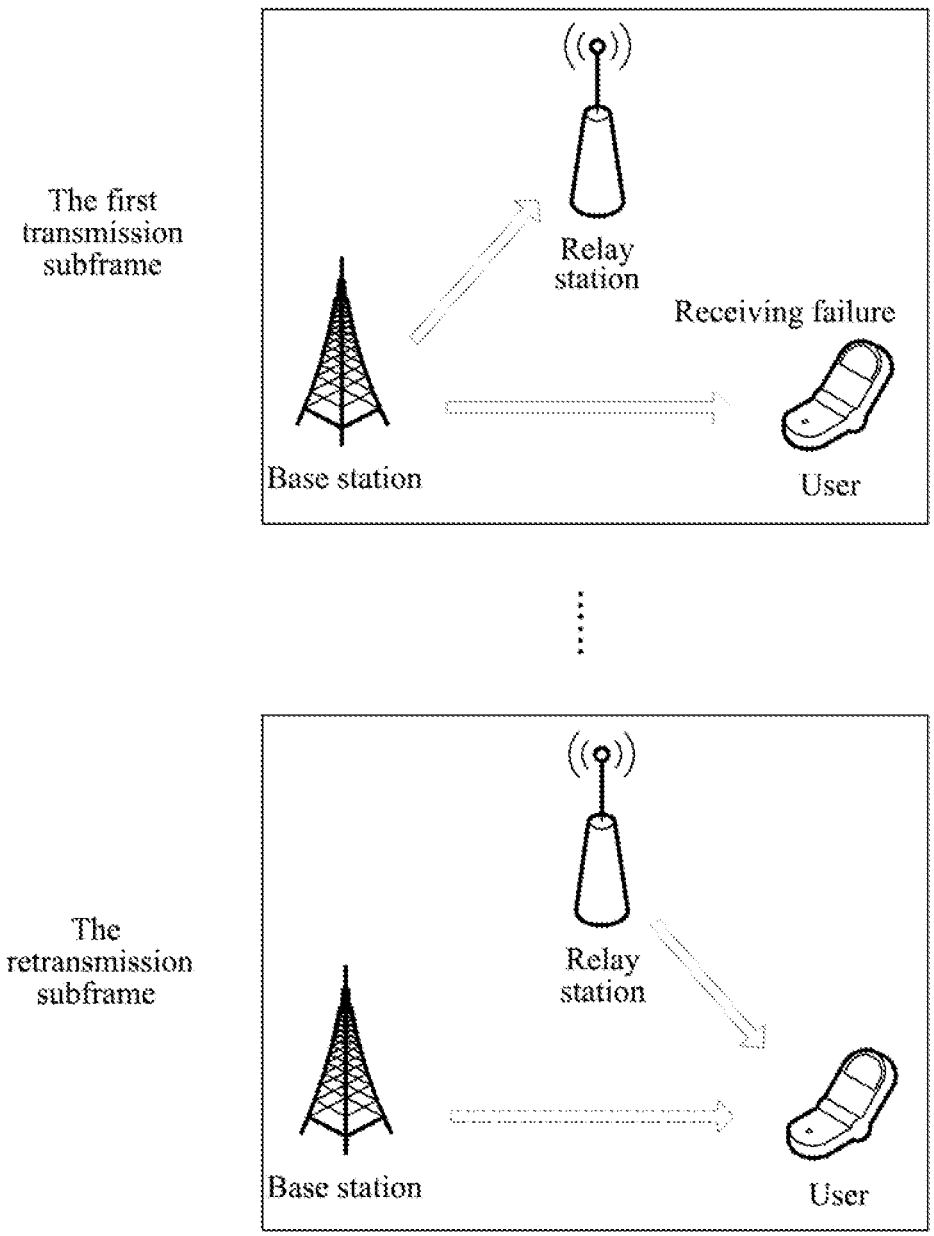
FIG. 3 is a schematic diagram of the relay station downlink cooperative retransmission.
Figure 4:
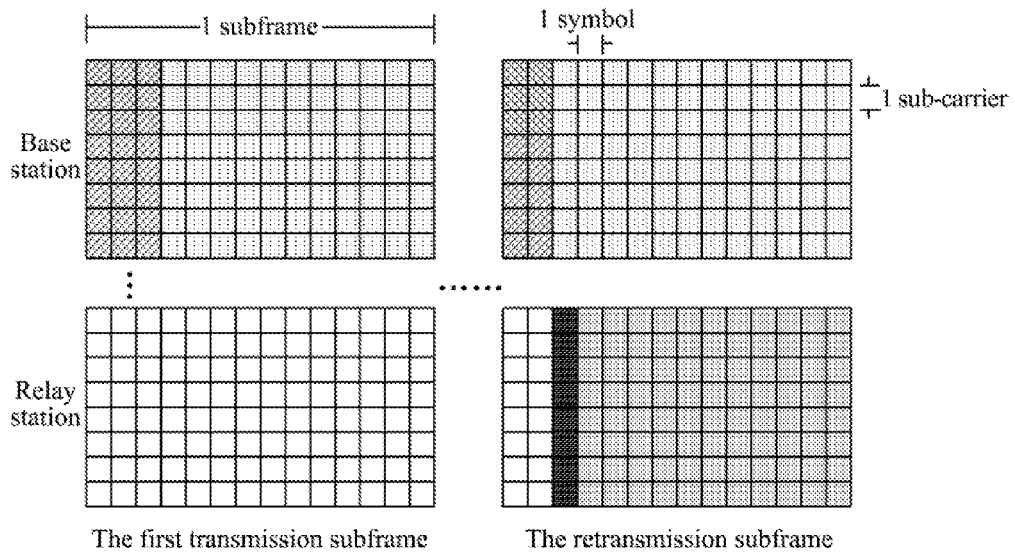
FIGS. 4 (a)~(b) are schematic diagrams of the problems possibly encountered by the relay station downlink cooperative retransmission.
Figure 4:
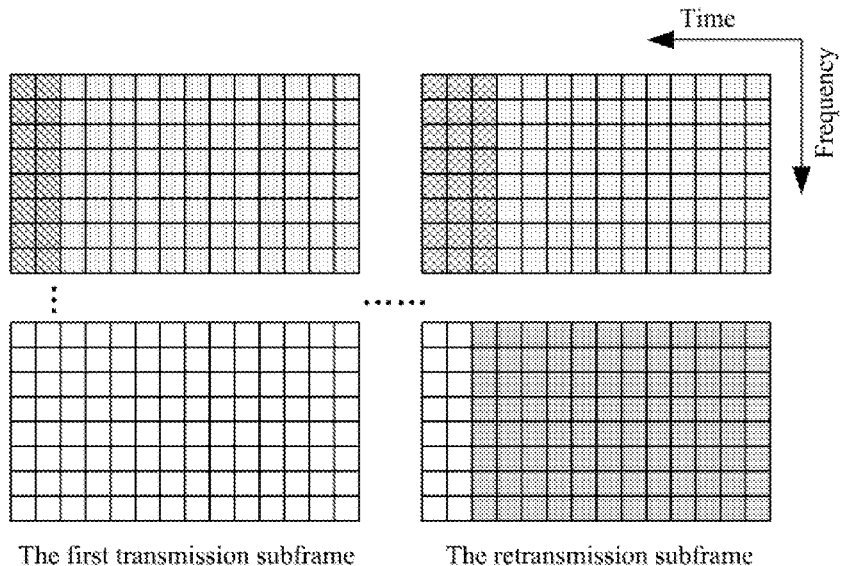
Figure 5:
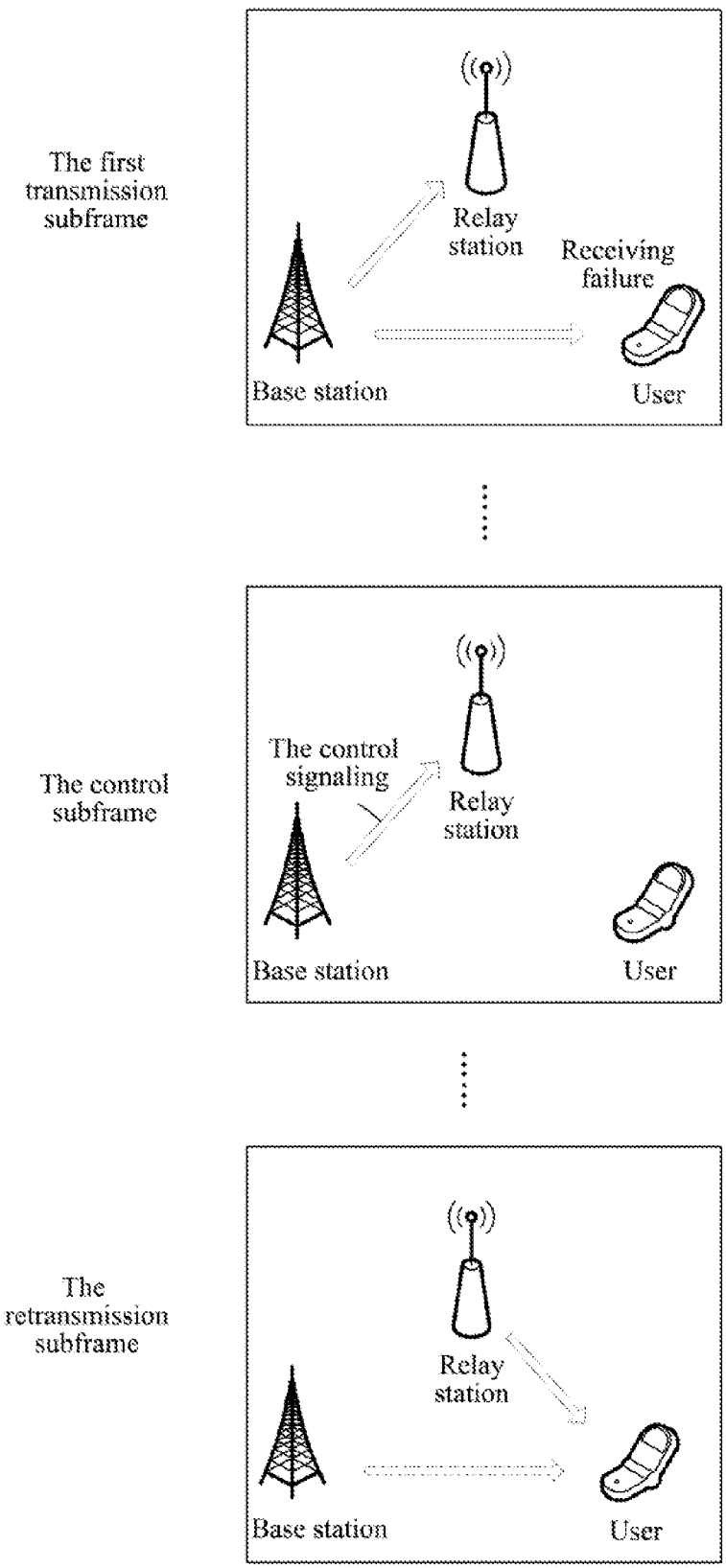
FIG. 5 is a schematic diagram of the relay station downlink cooperative retransmission based on the control signaling.
Figure 6:
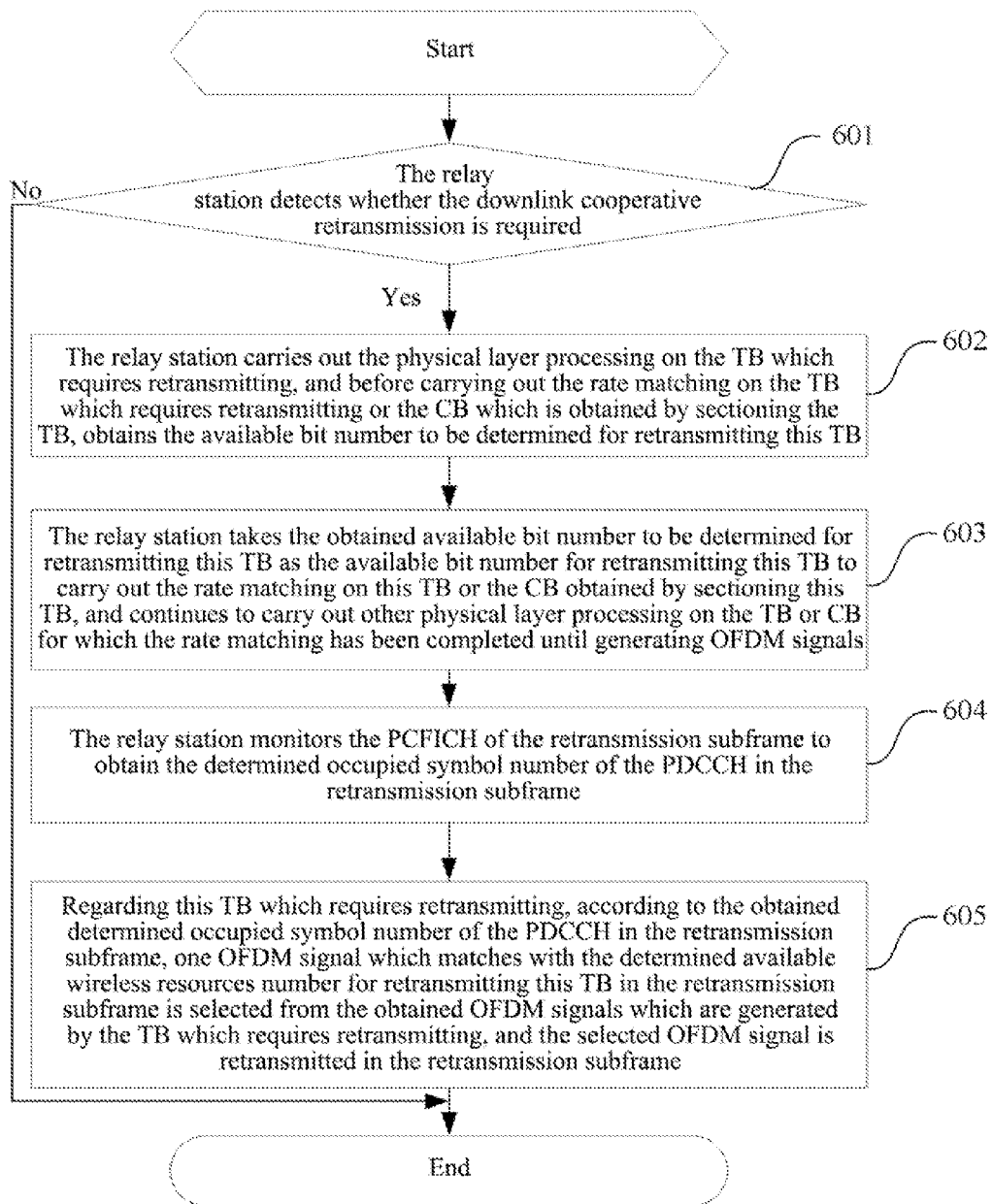
FIG. 6 is a flow chart of the method for the relay station downlink cooperative retransmission according to the example of the present invention.

As shown in FIG. 6, the method according to the example of the present invention comprises following steps:

Step 601, the relay station detects whether the downlink cooperative retransmission is required, and if yes, the next step is carried out, otherwise the method is ended and the subsequent steps will not be carried out any more;

Step 602, the relay station starts to carry out the physical layer processing on the TB which requires retransmitting, and before carrying out the rate matching on the TB which requires retransmitting or the Code Block (CB) which is obtained by sectioning the TB which requires retransmitting, obtains the number of available bits to be determined for retransmitting this TB;

wherein said physical layer processing includes all or parts of process of: adding the Cyclic Redundancy Check (CRC) to the TB, sectioning CB and adding the CRC to the CB, channel coding, rate matching, CBs concatenating, scrambling, modulating, layer mapping, pre-coding, wireless resources mapping, and generating the OFDM signal; in this step, completing all or parts of steps of adding the CRC to the TB, sectioning CB and adding the CRC to the CB, and channel coding thereinto; since the physical layer processing is a general technique, and thus the present invention only emphasizes on describing the content which is different from the prior art, and the processing methods which are the same with the prior art will not be described any more;

preferably, the number of available bits to be determined in one or more cases of retransmitting this TB can be obtained correspondingly according to the number of occupied symbols to be determined of the PDCCH in the retransmission subframe, the total number of available symbol s in this retransmission subframe, the number of sub-carriers and the number of modulation orders allocated to the TB which requires retransmitting, and the total Resource Element (RE) number occupied by the pilot, the synchronization signal and the system broadcast message;

furthermore, when the number of occupied symbols to be determined of the PDCCH in the retransmission subframe has N cases (N is a positive integer), in the kth case, the number of occupied symbols to be determined of the PDCCH in the retransmission subframe is $N_{S\_PDCCH}^{(k)}$ ($1 \leq k \leq N$), and the total number of available symbols in this retransmission subframe is $N_{S\_All}$, and then the number of available symbols to be determined for the retransmission in this retransmission subframe is $N_{S\_U}^{(k)}$ ($1 \leq k \leq N$), which can be obtained according to the following way:

$$N_{S\_U}^{(k)} = N_{S\_All} - N_{S\_PDCCH}^{(k)} \text{ Symbol};$$

at this time, the number of sub-carriers and the number of modulation orders allocated to the TB which requires retransmitting are $N_{C\_U}$ and $Q_m$ respectively, and the total number of REs occupied by the pilot, the synchronization signal and the system broadcast message is $N_{RE}'$, and the number of available bits $N_{B\_U}^{(k)}$, $1 \leq k \leq N$, to be determined in the N cases of retransmitting this TB can be obtained in the following way:

$$N_{B\_U}^{(k)} = (N_{S\_U}^{(k)} \times N_{C\_U} - N_{RE}') \times Q_m \text{ Bit};$$

Step 603: the relay station takes the obtained number of available bits to be determined for retransmitting this TB as the number of available bits for retransmitting this TB to carry out the rate matching on this TB or the CB obtained by sectioning this TB, and continues to carry out other physical layer processing on the TB or CB for which the rate matching has been completed, specifically including: parts or all of process of the CB concatenating, scrambling, modulating, layer mapping, pre-coding, wireless resources mapping, and generating the OFDM signal, until generating OFDM signals;

in this step, when the relay station carries out the rate matching on said TB or said CB obtained by sectioning the TB, the number of available bits to be determined for retransmitting this TB in the corresponding retransmission subframe may have one or more cases, the number of available bits to be determined in each case is taken as the number of available bits for retransmitting this TB respectively to carry out the rate matching respectively, and correspondingly one or more TBs or CBs for which the rate matching has been completed are outputted, and other physical layer processing is continually carried out, specifically including parts or all of steps of: the CB concatenating, scrambling, modulating, layer mapping, pre-coding, wireless resources mapping, and generating the OFDM signal, until correspondingly generating one or more OFDM signals;

Step 604, the relay station monitors the PCFICH of the retransmission subframe to obtain the determined number of occupied symbols of the PDCCH in the retransmission subframe;

wherein step 604 can be carried out just after completing the rate matching in the step 603, namely, step 604 can be carried out with a part of the step 603 in parallel;

Step 605, regarding this TB which requires retransmitting, according to the obtained determined number of occupied symbols of the PDCCH in the retransmission subframe, one OFDM signal which is corresponding to the determined number of available wireless resources for retransmitting this TB in the retransmission subframe is selected from the obtained OFDM signals which are generated by the TB which requires retransmitting, and the selected OFDM signal is retransmitted in the retransmission subframe;

in this step, according to the determined number of occupied symbols of the PDCCH in the retransmission subframe, the relay station can further obtain the determined number of available symbols for retransmitting this TB in the retransmission subframe, or further obtain the determined number of available bits for retransmitting this TB, and correspondingly, according to the determined number of occupied symbols of the PDCCH in the retransmission subframe, or the determined number of available symbols of retransmitting this TB in the retransmission subframe, or the determined number of available bits of retransmitting this TB, one OFDM signal which is corresponding to the determined number of available wireless resources for retransmitting this TB in the retransmission subframe is selected to be retransmitted;

wherein the determined number of occupied symbols $N_{S\_PDCCH}'$ of the PDCCH in the retransmission subframe can be obtained directly by monitoring the PCFICH of the retransmission subframe;

furthermore, the determined number of available symbols $N_{S\_U}'$ for retransmitting this TB in the retransmission subframe can be obtained in the following way:

$$N_{S\_U}'=N_{S\_All}-N_{S\_PDCCH}' \text{Symbol};$$

furthermore, the determined number of available bits $N_{S\_U}'$ for retransmitting this TB can be obtained in the following way:

$$N_{B\_U}'=(N_{S\_U}' \times N_{C\_U}-N_{RE}') \times Q_m \text{ Bit};$$

between the steps 604 and 605, after the relay station monitors the PCFICH and before retransmission transmitting, there may be a period to be the guard interval, and in the guard interval, the relay station does not carry out the downlink receiving and downlink transmitting;

in the step 605, during retransmission transmitting, it can be the base station and the relay station that carry out retransmission transmitting at the same time, and also can be the relay station that carries out retransmission transmitting only.

Figure 7:
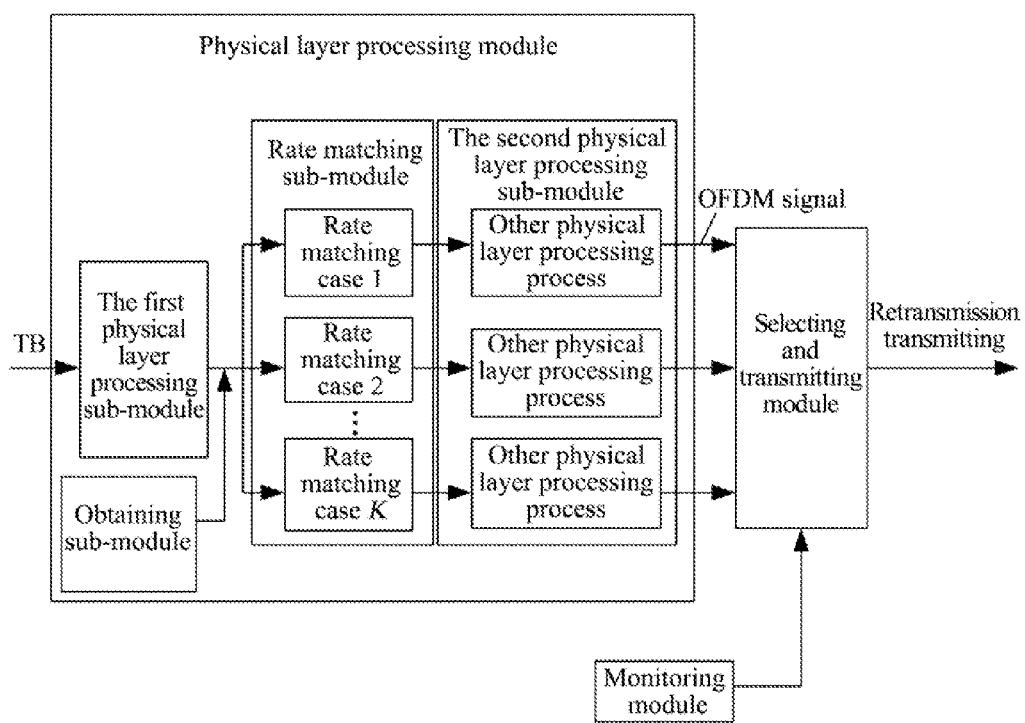
FIG. 7 is a schematic diagram of the apparatus for the relay station downlink cooperative retransmission according to the example of the present invention.

As shown in FIG. 7, the apparatus for the downlink cooperative retransmission according to the example of the present invention is applied in the relay station, and the apparatus comprises: a physical layer processing module, a monitoring module, and a selecting and transmitting module;

said physical layer processing module is configured to carry out the physical layer processing in advance on the data which requires retransmitting according to various existing cases that the number of available wireless resources for the retransmitting data in the retransmission subframe is to be determined, and generate corresponding OFDM signals;

said monitoring module is configured to monitor the Physical Control Format Indicator Channel (PCFICH) of the retransmission subframe;

said selecting and transmitting module is connected with said physical layer processing module and monitoring module respectively, and the selecting and transmitting module is configured to obtain the OFDM signals generated by said physical layer processing module, and according to the monitoring result of the monitoring module, select an OFDM signal which is corresponding to the determined number of available wireless resources from said OFDM signals to carry out retransmission transmitting.

Specifically, said physical layer processing module comprises the first physical layer processing sub-module, a rate matching sub-module, and the second physical layer processing sub-module connected in sequence, and an obtaining sub-module which is connected with the rate matching sub-module;

said first physical layer processing sub-module is configured to carry out all or parts of steps of adding a CRC to the TB, sectioning CB and adding a CRC to the CB, and channel coding;

said obtaining sub-module is configured to obtain the number of available bits to be determined for retransmitting this TB;

said rate matching sub-module is configured to take said number of available bits to be determined for retransmitting this TB as the number of available bits for retransmitting this TB, and carry out rate matching on this TB or the CB obtained by sectioning this TB which have been processed by the first physical layer processing sub-module;

said second physical layer processing sub-module is configured to carry out parts or all of steps of CB concatenating, scrambling, modulating, layer mapping, pre-coding, and wireless resources mapping for TB or CB after rate matching sub-module implements rate matching, and generate OFDM signals.

Wherein said obtaining sub-module is configured to obtain the number of available bits to be determined of one or more cases of retransmitting this TB according to the number of occupied symbols to be determined of the PDCCH in the retransmission subframe, the total number of available symbols in the retransmission subframe, the number of sub-carriers and the number of modulation orders allocated to the TB which requires retransmitting, and the total Resource Element (RE) number occupied by the pilot, the synchronization signal and the system broadcast message.

When the number of occupied symbols to be determined of the PDCCH in the retransmission subframe has N cases, in the kth case, the number of occupied symbols to be determined of the PDCCH in the retransmission subframe is $N_{S\_PDCCH}^{(k)}$, wherein $1 \leq k \leq N$, and N is a positive integer; the total number of available symbols in this retransmission subframe is $N_{S\_All}$, and then the obtaining sub-module obtains the number of available symbols to be determined $N_{S\_U}^{(k)}$ for retransmission in the retransmission subframe in the following way:

$$N_{S\_U}^{(k)}=N_{S\_All}-N_{S\_PDCCH}^{(k)};$$

At this time, the number of sub-carriers and the number of modulation orders allocated to the TB which requires retransmitting are $N_{C\_U}$ and $Q_m$ respectively, and the total number of REs occupied by the pilot, the synchronization signal and the system broadcast message is $N_{RE}'$, and then the obtaining sub-module obtains the number of available bits to be determined $N_{B\_U}^{(k)}$ ($1 \leq k \leq N$) in the N cases of retransmitting this TB in the following way:

$$N_{B\_U}^{(k)}=(N_{S\_U}^{(k)} \times N_{C\_U}-N_{RE}') \times Q_m.$$

When the rate matching sub-module carries out the rate matching on said TB or the CB obtained by sectioning said TB, respectively takes the number of available bits to be determined in each case as the number of available bits for retransmitting this TB to carry out the rate matching respectively, and correspondingly outputs one or more TBs or CBs for which the rate matching has been completed, and, the second physical layer processing sub-module continues to carry out the physical layer processing until generating one or more OFDM signals correspondingly.

Said monitoring module is configured to monitor the PCFICH of the retransmission subframe, and obtain the determined number of occupied symbols of the PDCCH in the retransmission subframe;

said selecting and transmitting module is configured to regarding the TB which requires retransmitting, according to the determined number of occupied symbols of the PDCCH in the retransmission subframe obtained from the monitoring module, select one OFDM signal which is corresponding to the determined number of available wireless resources for retransmitting this TB in the retransmission subframe from the OFDM signals generated by this TB which requires retransmitting and obtained from the physical layer processing module, and retransmit the selected OFDM signal in the retransmission subframe.

Said selecting and transmitting module can also further obtain the determined number of available symbols for retransmitting this TB in the retransmission subframe according to the determined number of occupied symbols of the PDCCH in the retransmission subframe, and select one OFDM signal which is corresponding to the determined number of available wireless resources for retransmitting this TB in the retransmission subframe to carry out retransmission transmitting according to said determined number of available symbols for retransmitting this TB in said retransmission subframe; or further obtain the determined number of available symbols for retransmitting this TB in the retransmission subframe according to the determined number of occupied symbols of the PDCCH in the retransmission subframe, and then further obtain the determined number of available bits for retransmitting this TB, and according to said determined number of available bits for retransmitting this TB, select one OFDM signal which is corresponding to the determined number of available wireless resources for retransmitting this TB in the retransmission subframe to carry out retransmission transmitting.

Below it will further describe the present invention by specific examples.

Application Example One

In a relay network which uses the downlink cooperative retransmission mode, the relay station detects that 1 TB requires carrying out the downlink cooperative retransmission;

the relay stations starts to carry out the physical layer processing on the TB which requires retransmitting, and before carrying out the rate matching on this TB, the relay station obtains that the number of occupied symbols to be determined of the PDCCH in the retransmission subframe has three cases, respectively 1, 2, or 3, namely, $N_{S\_PDCCH}^{(1)}=1$, $N_{S\_PDCCH}^{(2)}=2$ or $N_{S\_PDCCH}^{(3)}=3$, and it is known that the total number of available symbols $N_{S\_All}$ in this retransmission subframe is 14, then the number of available symbols $N_{S\_U}^{(k)}$ ($1 \leq k \leq 3$) to be determined which is configured to be retransmitted in the retransmission subframe is obtained in the following way:

$N_{S\_U}^{(1)} = N_{S\_All} - N_{S\_PDCCH}^{(1)}$ 14 1 13 Symbol $N_{S\_U}^{(2)} = N_{S\_All} - N_{S\_PDCCH}^{(2)}$ 14 2 12 Symbol $N_{S\_U}^{(3)} = N_{S\_All} - N_{S\_PDCCH}^{(3)}$ 14 3 11 Symbol At this time, it is known that the number of sub-carriers $N_{C\_U}$ and the number of modulation orders $Q_m$ allocated to this TB respectively are 24 and 2, and the total number of REs $N_{RE}'$ occupied by the pilot, the synchronization signal and the system broadcast message is 12, and then the number of available bits $N_{B\_U}^{(k)}$, $1 \leq k \leq 3$ to be determined in the 3 cases of retransmitting this TB is further obtained in the following way:

$N_{B\_U}^{(1)} = (N_{S\_U}^{(1)} \times N_{C\_U} - N_{RE}') \times Q_m (\mathbf{13\ 24\ 12})\ 2 \times 600$ Bit $N_{B\_U}^{(2)} = (N_{S\_U}^{(2)} \times N_{C\_U} - N_{RE}') \times Q_m (\mathbf{12\ 24\ 12})\ 2 \times 552$ Bit $N_{B\_U}^{(3)} = (N_{S\_U}^{(3)} \times N_{C\_U} - N_{RE}') \times Q_m (\mathbf{11\ 24\ 12})\ 2 \times 504$ Bit The relay station respectively takes the obtained number of available bits to be determined $N_{B\_U}^{(k)}$, $1 \leq k \leq 3$, in the 3 cases of retransmitting this TB as the number of available bits for retransmitting this TB to carry out the rate matching on this TB respectively, and continues to carry out other physical layer processing on the TB for which the rate matching has been completed until generating the corresponding OFDM signals $S_{OFDM}^{(k)}$, $1 \leq k \leq 3$, in the 3 cases, and the following corresponding relationship is known:

| The OFDM signal | The number of available bits to be determined of the retransmission (Bit) | The number of available symbols to be determined of the retransmission (Symbol) | The number of occupied symbols to be determined of the PDCCH (Symbol) |
|---|---|---|---|
| $S_{OFDM}^{(1)}$ | 600 | 13 | 1 |
| $S_{OFDM}^{(2)}$ | 552 | 12 | 2 |
| $S_{OFDM}^{(3)}$ | 504 | 11 | 3 |

The relay station monitor the PCFICH of the retransmission subframe to obtain that the determined number of occupied symbols of the PDCCH in the retransmission subframe is 3;

Regarding this TB which requires retransmitting, according to the determined number of occupied symbols of the PDCCH in the retransmission subframe being 3, it can be judged that the OFDM signal $S_{OFDM}^{(3)}$ is corresponding to the determined number of available wireless resources for retransmitting this TB, and then the OFDM signal $S_{OFDM}^{(3)}$ is selected to be retransmitted in the retransmission subframe and the base station at the same time. And the relay station reserves 2 OFDM symbols after monitoring the PCFICH and before the retransmission transmitting as the guard interval, and does not carry out the downlink receiving and transmitting.

Application Example Two

In a relay network which uses the downlink cooperative retransmission mode, the relay station detects that 1 TB requires carrying out the downlink cooperative retransmission;

the relay stations starts to carry out the physical layer processing on the TB which requires retransmitting, and before carrying out the rate matching on the CB obtained by sectioning this TB, the relay station obtains that the number of occupied symbols to be determined of the PDCCH in the retransmission subframe has three cases, respectively 2, 3, or 4, namely, $N_{S\_PDCCH}^{(1)}=2$, $N_{S\_PDCCH}^{(2)}=3$ or $N_{S\_PDCCH}^{(3)}=4$, and it is known that the total number of available symbols $N_{S\_All}$ in this retransmission subframe is 14, and then the number of available symbols $N_{S\_U}^{(k)}$ ($1 \leq k \leq 3$) to be determined for the retransmission in the retransmission subframe is obtained in the following way:

$N_{S\_U}^{(1)} = N_{S\_All} - N_{S\_PDCCH}^{(1)}$ 14 2 12 Symbol $N_{S\_U}^{(2)} = N_{S\_All} - N_{S\_PDCCH}^{(2)}$ 14 3 11 Symbol $N_{S\_U}^{(3)} = N_{S\_All} - N_{S\_PDCCH}^{(3)}$ 14 4 10 Symbol At this time, it is known that the number of sub-carriers $N_{C\_U}$ and the number of modulation orders $Q_m$ allocated to this TB respectively are 48 and 4, and the total number of REs $N_{RE}'$ occupied by the pilot, the synchronization signal and the system broadcast message is 64, and then the number of available bits to be determined $N_{B\_U}^{(k)}$ 1≤k≤3 in the 3 cases of retransmitting this TB is further obtained in the following way:

$$N_{B\_U}^{(1)}=(N_{S\_U}^{(1)}\times N_{C\_U}-N_{RE}')\times Q_m(13\ 48\ 64)$$
$$4\times 2048\ \text{Bit}$$

$$N_{B\_U}^{(2)}=(N_{S\_U}^{(2)}\times N_{C\_U}-N_{RE}')\times Q_m(11\ 48\ 64)$$
$$4\times 1856\ \text{Bit}$$

$$N_{B\_U}^{(3)}=(N_{S\_U}^{(3)}\times N_{C\_U}-N_{RE}')\times Q_m(10\ 48\ 64)\ 2\times 504$$
$$\text{Bit}$$

The relay station respectively takes the obtained number of available bits $N_{B\_U}^{(k)}$ (1≤k≤3) to be determined in the 3 cases of retransmitting this TB as the total number of available bits for retransmitting this TB to carry out the rate matching on the CB obtained by sectioning this TB respectively, and continues to carry out other physical layer processing on the CB for which the rate matching has been completed until generating the corresponding OFDM signals $S_{OFDM}^{(k)}$, 1≤k≤3, in the 3 cases, and the following corresponding relationship is known.

| The OFDM signal | The number of available bits to be determined of the retransmission (Bit) | The number of available symbols to be determined of the retransmission (Symbol) | The number of occupied symbols to be determined of the PDCCH (Symbol) |
|---|---|---|---|
| $S_{OFDM}^{(1)}$ | 2048 | 12 | 2 |
| $S_{OFDM}^{(2)}$ | 1856 | 11 | 3 |
| $S_{OFDM}^{(3)}$ | 1664 | 10 | 4 |

The relay station monitors the PCFICH of the retransmission subframe to obtain that the determined number of occupied symbols of the PDCCH of the retransmission subframe is 2, and then the determined number of available symbols $N_{S\_U}'$ for for retransmitting this TB in the retransmission subframe is obtained in the following way:

$$N_{S\_U}'=N_{S\_All}-N_{S\_PDCCH}'=14\ 2\ 12\ \text{Symbol};$$

Regarding this TB which requires retransmitting, according to the determined number of available symbols for retransmitting this TB in the retransmission subframe being 12, it can be judged that the OFDM signal $S_{OFDM}^{(1)}$ is corresponding to the determined number of available wireless resources for retransmitting this TB, and then the OFDM signal $S_{OFDM}^{(1)}$ is selected to be retransmitted in the retransmission subframe. And the relay station reserves 1 OFDM symbol after monitoring the PCFICH and before the retransmission transmitting as the guard interval, and does not carry out the downlink receiving and transmitting.

Application Example Three

In a relay network which uses the downlink cooperative retransmission mode, the relay station detects that 1 TB requires carrying out the downlink cooperative retransmission;

the relay stations starts to carry out the physical layer processing on the TB which requires retransmitting, and before carrying out the rate matching on this TB, the relay station obtains that the number of occupied symbols to be determined of the PDCCH in the retransmission subframe has two cases, respectively 1 or 2, namely, $N_{S\_PDCCH}^{(1)}=1$ or $N_{S\_PDCCH}^{(2)}=2$, and it is known that the total number of available symbols $N_{S\_All}$ in this retransmission subframe is 14, then the number of available symbols $N_{S\_U}^{(k)}$ (1≤k≤2) to be determined for retransmission in the retransmission subframe is obtained in the following way:

$$N_{S\_U}^{(1)}=N_{S\_All}-N_{S\_PDCCH}^{(1)}14\ 1\ 13\ \text{Symbol}$$

$$N_{S\_U}^{(2)}=N_{S\_All}-N_{S\_PDCCH}^{(2)}14\ 2\ 12\ \text{Symbol}$$

At this time, it is known that the number of sub-carriers $N_{C\_U}$ and the number of modulation orders $Q_m$ allocated to this TB are 36 and 6 respectively, and the total number of REs $N_{RE}'$ occupied by the pilot, the synchronization signal and the system broadcast message is 36, and then the number of available bits $N_{B\_U}^{(k)}$ (1≤k≤2) for retransmitting this TB is further obtained in the following way:

$$N_{B\_U}^{(1)}=(N_{S\_U}^{(1)}\times N_{C\_U}-N_{RE}')\times Q_m(13\ 36\ 36)$$
$$6\times 2592\ \text{Bit}$$

$$N_{B\_U}^{(2)}=(N_{S\_U}^{(2)}\times N_{C\_U}-N_{RE}')\times Q_m(12\ 36\ 36)$$
$$6\times 2376\ \text{Bit}$$

The relay station respectively takes the obtained number of available bits $N_{B\_U}^{(k)}$ (1≤k≤2) to be determined in the 2 cases of retransmitting this TB as the total number of available bits for retransmitting this TB to carry out the rate matching on this TB, and continues to carry out other physical layer processing on the TB for which the rate matching has been completed until generating the corresponding OFDM signals $S_{OFDM}^{(k)}$ (1≤k≤2), and the following corresponding relationship is known:

| The OFDM signal | The number of available bits to be determined of the retransmission (Bit) | The number of available symbols to be determined of the retransmission (Symbol) | The number of occupied symbols to be determined of the PDCCH (Symbol) |
|---|---|---|---|
| $S_{OFDM}^{(1)}$ | 2592 | 13 | 1 |
| $S_{OFDM}^{(2)}$ | 2376 | 12 | 2 |

The relay station monitors the PCFICH of the retransmission subframe to obtain that the determined number of occupied symbols of the PDCCH in the retransmission subframe is 1, and then the determined number of available symbols $N_{S\_U}'$ for retransmitting this TB in the retransmission subframe is obtained in the following way:

$$N_{S\_U}'=N_{S\_All}-N_{S\_PDCCH},\ 14\ 1\ 13\ \text{Symbol};$$

At this time, the determined number of available bits $N_{B\_U}'$ for retransmitting this TB is obtained in the following way:

$$N_{B\_U}'=(N_{S\_U}'\times N_{C\_U}-N_{RE}')\times Q_m(13\ 36\ 36)\ 6\times 2592$$
$$\text{Bit}$$

Regarding this TB which requires retransmitting, according to the determined number of available bits for retransmitting this TB in the retransmission subframe being 2592, it can be judged that the OFDM signal $S_{OFDM}^{(1)}$ is corresponding to the determined number of available wireless resources for retransmitting this TB, and then the OFDM signal $S_{OFDM}^{(1)}$ is selected to be retransmitted in the retransmission subframe.

Although the present invention is described with reference to the specific examples, various modifications and transformations can be made by those skilled in the art without departing from the spirit or scope of the present invention. Such modifications and transformations are considered within the scope of the present invention and the appended claims.

INDUSTRIAL APPLICABILITY

The present invention provides a method and apparatus for relay station downlink cooperative retransmission, which can efficiently solve the problem that the wireless resources number varies during downlink retransmitting data and the relay station cooperative communication is unable to be carried out normally, without introducing any extra overhead and time delay, and without the control signaling, thus reducing the system complexity, saving the wireless resources, ensuring the flexibility of the subframe configuration, and improving the service quality and the resources utilization efficiency.

What is claimed is:

1. A method for relay station downlink cooperative retransmission, comprising:
   the relay station carrying out physical layer processing in advance on data that requires retransmitting according to different scenarios associated different possible number of available wireless resources for retransmitting data in a retransmission subframe, and generating corresponding Orthogonal Frequency Division Multiplexing (OFDM) signals; and
   said relay station monitoring the Physical Control Format Indicator Channel (PCFICH) of the retransmission subframe to obtain the determined number of occupied symbols of the Physical Downlink Control Channel (PDCCH) in the retransmission subframe; and
   according to the determined number of occupied symbols of the PDCCH in the retransmission subframe obtained from the monitoring result, said relay station selecting one of the generated OFDM signal with the corresponding number of available wireless resources for retransmitting the TB in the retransmission subframe from the OFDM signals generated from the Transport Block (TB) that requires retransmitting obtained by the physical layer processing step, and retransmitting the selected OFDM signal in the retransmission subframe.

2. The method as claimed in claim 1, wherein the step of carrying out physical layer processing and generating OFDM signals comprises:
   when the relay station is required to carry out the downlink cooperative retransmission, carrying out the physical layer processing on a Transport Block (TB) that requires retransmitting, and before carrying out rate matching on the TB which requires retransmitting or a Code Block (CB) obtained by sectioning this TB, obtaining the number of available bits to be determined for retransmitting this TB; and the relay station taking said number of available bits to be determined for retransmitting this TB as the number of available bits for retransmitting this TB, carrying out the rate matching on this TB or the CB obtained by sectioning this TB, and continuing to carry out the physical layer processing on the TB or CB for which the rate matching has been completed, and generating the OFDM signals;
   wherein in the step of monitoring the PCFICH of the retransmission subframe, the relay station monitors the PCFICH of the retransmission subframe to obtain a determined number of occupied symbols of a Physical Downlink Control Channel (PDCCH) in the retransmission subframe;
   in the step of selecting the OFDM signal to carry out retransmission transmitting, regarding the TB which requires retransmitting, according to the obtained determined number of occupied symbols of the PDCCH in the retransmission subframe, the relay station selects one OFDM signal which is corresponding to the determined number of available wireless resources number for retransmitting the TB in retransmission subframe from the obtained OFDM signals generated by the TB which requires retransmitting, and retransmits the selected OFDM signal in the retransmission subframe.

3. The method as claimed in claim 2, wherein
   in the step of obtaining the number of available bits to be determined for retransmitting this TB, according to the number of occupied symbols to be determined of the PDCCH in the retransmission subframe, a total number of available symbols in the retransmission subframe, the number of sub-carriers and the number of modulation orders allocated to the TB which requires retransmitting, and a total number of Resource Element (RE) occupied by a pilot, a synchronization signal and a system broadcast message, the relay station obtains the number of available bits to be determined in one or more cases of retransmitting this TB.

4. The method as claimed in claim 3, wherein
   in the step of obtaining the number of available bits to be determined for retransmitting this TB, when the number of occupied symbols to be determined of the PDCCH in the retransmission subframe has N cases, in the kth case, the number of symbol numbers which will be occupied by the PDCCH in the retransmission subframe is $N_{S\_PDCCH}^{(k)}$, wherein $1 \leq k \leq N$, and N is a positive integer; and the total number of available symbols in the retransmission subframe is $N_{S\_All}$, and the number of available symbols to be determined $N_{S\_U}^{(k)}$ for retransmission in the retransmission subframe is obtained in a following way:

$$N_{S\_U}^{(k)} = N_{S\_All} - N_{S\_PDCCH}^{(k)};$$

at this time, the number of sub-carriers and the number of modulation orders allocated to the TB which requires retransmitting are respectively $N_{C\_U}$ and $Q_m$, the total number of RE occupied by the pilot, the synchronization signal and the system broadcast message is $N_{RE}'$, and then the number of available bits to be determined $N_{B\_U}^{(k)}$ in the N cases of retransmitting this TB is obtained in a following way:

$$N_{B\_U}^{(k)} = (N_{S\_U}^{(k)} \times N_{C\_U} - N_{RE}') \times Q_m.$$

5. The method as claimed in claim 2, wherein
   in the step of carrying out the rate matching, said relay station respectively takes the number of available bits to be determined in each case as a total number of available bit for retransmitting this TB to carry out the rate matching respectively, and correspondingly outputs one or more TBs or CBs for which the rate matching has been completed, and continues to carry out the physical layer processing until generating one or more OFDM signals.

6. The method as claimed in claim 2, wherein
   in the step of selecting the OFDM signal to carry out retransmission transmitting, according to the determined number of occupied symbols of the PDCCH in the retransmission subframe, the relay station further obtains the determined number of available symbols for retransmitting this TB in the retransmission subframe, and according to said determined number of available symbols for retransmitting this TB in the retransmission subframe, selects one OFDM signal which is corresponding to the determined number of available wireless resources for retransmitting the TB in retransmission subframe to carry out retransmission transmitting;

said determined number of available symbols for $N_{S\_U}'$ for retransmitting this TB in the retransmission subframe is obtained in a following way:

$$N_{S\_U}' = N_{S\_All} N_{S\_PDCCH}';$$

wherein $N_{S\_All}$ is the total number of available symbols in the retransmission subframe, and $N_{S\_PDCCH}'$ is the determined number of occupied symbols of the PDCCH in the retransmission subframe.

7. The method as claimed in claim 2, wherein
in the step of selecting the OFDM signal to carry out retransmission transmitting, according to the determined number of occupied symbols of the PDCCH in the retransmission subframe, the relay station further obtains the determined number of available symbols for retransmitting this TB in the retransmission subframe, and further obtains the determined number of available bits for retransmitting this TB, and according to said determined number of available bits for retransmitting this TB, selects one OFDM signal which is corresponding to the determined number of available wireless resources for retransmitting the TB in retransmission subframe to carry out retransmission transmitting;
said determined number of available bits $N_{B\_U}'$ for retransmitting this TB is obtained in a following way:

$$N_{B\_U}' = (N_{S\_U}' \times N_{C\_U} - N_{RE}') \times Q_m;$$

wherein is $N_{S\_U}'$ is the determined number of available symbols for retransmitting this TB in the retransmission subframe, $N_{C\_U}$ is the number of sub-carriers allocated to the TB which requires retransmitting, $Q_m$ is the number of modulation orders allocated to the TB which requires retransmitting, and $N_{RE}'$ is the total number of RE occupied by a pilot, a synchronization signal and a system broadcast message.

8. The method as claimed in claim 1, wherein
after monitoring the PCFICH and before the retransmission transmitting, the relay station reserves a period as a guard interval, and the relay station does not carry out downlink receiving and downlink transmitting in the guard interval.

9. The method as claimed in claim 1, wherein
in the step of retransmission transmitting, both a base station and the relay station retransmits said OFDM signal which is corresponding to the determined number of available wireless resources at the same time, or only the relay station retransmits the OFDM signal which is corresponding to the determined number of available wireless resources.

10. An apparatus for downlink cooperative retransmission, comprising:
a physical layer processing module configured to carry out physical layer processing in advance on data that requires retransmitting according to different scenarios associated with different possible number of available wireless resources for retransmitting data in a retransmission subframe, and generates corresponding Orthogonal Frequency Division Multiplexing (OFDM) signals;
a monitoring module configured to monitor the Physical Control Format Indicator Channel (PCFICH) of the retransmission subframe to obtain the determined number of occupied symbols of a Physical Downlink Control Channel (PDCCH) in the retransmission sub frame;
a selecting and transmitting module connected with said physical layer processing module and the monitoring module respectively, and said selecting and transmitting module configured to regarding the TB that requires retransmitting, according to the determined number of occupied symbols of the PDCCH in the retransmission subframe obtained by the monitoring module, selects one of the generated OFDM signal with the corresponding number of available wireless resources for retransmitting the TB in the retransmission subframe from the OFDM signals generated from the Transport Block (TB) that requires retransmitting obtained by the physical layer processing module, and retransmits the selected OFDM signal in the retransmission subframe.

11. The apparatus as claimed in claim 10, wherein
said physical layer processing module comprises a first physical layer processing sub-module, a rate matching sub-module, and a second physical layer processing sub-module connected in sequence, and an obtaining sub-module connected with the rate matching sub-module;
said first physical layer processing sub-module is configured to carry out all or parts of steps of adding a Cyclic Redundancy Check (CRC) to a Transport Block (TB), Code Block (CB) sectioning and adding a CRC to the CB, and channel coding;
said obtaining sub-module is configured to obtain the number of available bit to be determined for retransmitting this TB;
said rate matching sub-module is configured to take said number of available bits to be determined for retransmitting this TB as the number of available bits for retransmitting this TB, carrying out rate matching on this TB or the CB obtained by sectioning this TB which have been processed by the first physical layer processing sub-module;
said second physical layer processing sub-module is configured to carry out all or parts of steps of CBs concatenating, scrambling, modulating, layer mapping, pre-coding, and wireless resources mapping for TB or CB after the rate matching sub-module implements the rate matching, and generate the OFDM signals.

12. The apparatus as claimed in claim 11, wherein
said obtaining sub-module is configured to according to the number of occupied symbols to be determined of the PDCCH in the retransmission subframe, the total number of available symbols in the retransmission subframe, the number of sub-carriers and the number of modulation orders allocated to the TB which requires retransmitting, and the total number of RE occupied by a pilot, a synchronization signal and a system broadcast message, obtain the number of available bits to be determined in one or more cases of retransmitting this TB;
wherein when the number of occupied symbols to be determined of the PDCCH in the retransmission subframe has N cases, in the kth case, the number of occupied symbols to be determined of the PDCCH in the retransmission subframe is $N_{S\_PDCCH}^{(k)}$, wherein $1 \leq k \leq N$, and N is a positive integer; and the total number of available symbols number in the retransmission subframe is $N_{S\_All}$ and the number of available symbols to be determined $N_{S\_U}^{(k)}$ for retransmission in the retransmission subframe is obtained by the obtaining sub-module in a following way:

$$N_{S\_U}^{(k)} = N_{S\_All} N_{S\_PDCCH}^{(k)};$$

at this time, the number of sub-carriers and the number of modulation orders allocated to the TB which requires retransmitting are respectively $N_{C\_U}$ and $Q_m$, the total number of RE occupied by the pilot, the synchronization signal and the system broadcast message is $N_{RE}'$, and then the number of available bits to be determined $N_{B\_U}^{(k)}$ (1≤k≤N) in the N cases of retransmitting this TB is obtained by the obtaining sub-module in a following way:

$$N_{B\_U}^{(k)} = (N_{S\_U}^{(k)} \times N_{C\_U} - N_{RE}') \times Q_m.$$

13. A relay station, and said relay station comprising said apparatus for downlink cooperative retransmission in claim 12.

14. The apparatus as claimed in claim 11, wherein
said monitoring module is configured to monitor the PCFICH of the retransmission subframe to obtain a determined number of occupied symbols of a Physical Downlink Control Channel (PDCCH) in the retransmission subframe;
said selecting and transmitting module is configured to regarding the TB which requires retransmitting, according to the determined number of occupied symbols of the PDCCH in the retransmission subframe obtained by the monitoring module, select one OFDM signal which is corresponding to the determined number of available wireless resources for retransmitting the TB in the retransmission subframe from the OFDM signals generated by the TB which requires retransmitting obtained by the physical layer processing module, and retransmits the selected OFDM signal in the retransmission subframe.

15. A relay station, and said relay station comprising said apparatus for downlink cooperative retransmission in claim 11.

16. The apparatus as claimed in claim 10, wherein
said selecting and transmitting module is also configured to according to the determined number of occupied symbols of the PDCCH in the retransmission subframe, further obtain a determined number of available symbols for retransmitting this TB in the retransmission subframe, and according to said determined number of available symbols for retransmitting this TB in the retransmission subframe, select one OFDM signal which matches with the determined number of available wireless resources for retransmitting the TB in retransmission subframe to carry out retransmission transmitting; or according to the determined number of occupied symbols of the PDCCH in the retransmission subframe, further obtain the determined number of available symbols for retransmitting this TB in the retransmission subframe, and further obtain a determined number of available bits for retransmitting this TB, and according to said determined number of available bits for retransmitting this TB, select one OFDM signal which is corresponding to the determined number of available wireless resources for retransmitting the TB in retransmission subframe to carry out retransmission transmitting.

17. A relay station, and said relay station comprising said apparatus for downlink cooperative retransmission in claim 16.

18. A relay station, and said relay station comprising said apparatus for downlink cooperative retransmission in claim 10.

19. A relay station, and said relay station comprising said apparatus for downlink cooperative retransmission in claim 10.

* * * * *